United States Patent [19]

Struglinski et al.

[11] Patent Number: 5,543,469
[45] Date of Patent: Aug. 6, 1996

[54] VISCOSITY MODIFIER POLYMERS

[75] Inventors: Mark J. Struglinski, Bridgewater; Gary W. Ver Strate, Atlantic Highlands; Lewis J. Fetters, Annandale, all of N.J.

[73] Assignee: Exxon Chemical Patents Inc., Linden, N.J.

[21] Appl. No.: 376,728

[22] Filed: Jan. 20, 1995

Related U.S. Application Data

[60] Continuation of Ser. No. 226,750, Apr. 12, 1994, abandoned, which is a division of Ser. No. 668,653, Mar. 13, 1991, Pat. No. 5,310,490.

[51] Int. Cl.$^6$ .............. C08F 297/02; C08F 8/04; C10M 143/12
[52] U.S. Cl. .............. 525/314; 508/591; 585/12
[58] Field of Search .............. 525/314, 940

[56] References Cited

U.S. PATENT DOCUMENTS

| | | | |
|---|---|---|---|
| 3,465,063 | 9/1969 | Hassel et al. | 260/876 |
| 3,554,911 | 1/1971 | Schiff et al. . | |
| 3,595,942 | 7/1971 | Wald et al. . | |
| 3,630,905 | 12/1971 | Sorgo . | |
| 3,668,125 | 6/1972 | Anderson . | |
| 3,752,767 | 8/1973 | Eckert et al. . | |
| 3,763,044 | 10/1973 | Anderson . | |
| 3,772,196 | 11/1973 | St. Clair et al. . | |
| 3,795,615 | 3/1974 | Pappas et al. | 252/59 |
| 3,835,053 | 9/1974 | Meier et al. . | |
| 3,965,019 | 6/1976 | St. Clair et al. | 252/59 |
| 4,032,459 | 6/1977 | Crossland et al. | 252/51.5 A |
| 4,038,237 | 7/1977 | Snyder | 260/33.6 AQ |
| 4,068,057 | 1/1978 | Engel et al. | 526/49 |
| 4,068,058 | 1/1978 | Engel et al. | 526/49 |
| 4,073,737 | 2/1978 | Elliott | 252/51.5 A |
| 4,082,680 | 4/1978 | Mitacek . | |
| 4,358,565 | 11/1982 | Eckert . | |
| 4,418,234 | 11/1983 | Schiff et al. . | |
| 4,436,873 | 3/1984 | Furukawa et al. | 525/314 |
| 4,578,429 | 3/1986 | Gergen . | |
| 4,620,048 | 10/1986 | Ver Strate et al. | 585/10 |
| 4,804,794 | 2/1989 | Ver Strate et al. | 585/12 |
| 4,900,461 | 2/1990 | Ver Strate et al. . | |
| 5,164,455 | 11/1992 | Agosinis et al. | 525/314 |
| 5,187,236 | 2/1993 | Coolbaugh et al. | 525/314 |
| 5,290,868 | 3/1994 | Chung et al. | 525/285 |

FOREIGN PATENT DOCUMENTS

| | | |
|---|---|---|
| 0029622 | 6/1981 | European Pat. Off. . |
| 0318848 | 6/1989 | European Pat. Off. . |
| 0344836 | 12/1989 | European Pat. Off. . |
| 2346439 | 10/1977 | France . |
| 1293074 | 9/1970 | United Kingdom . |
| 1575449 | 2/1977 | United Kingdom . |

OTHER PUBLICATIONS

"Elastomeric Polydiene ABA Triblock Copolymers With Crystalline End Blocks" by M. Morton, Chemical Abstracts, vol. 97, No. 18, Nov. 1982.

"Morton M. and Fetters, L. J. Rubber Chemistry and Technology," Anionic Polymerization of Vinyl Monomers, pp. 359–409, vol. 48, 1975.

*Primary Examiner*—Vasu S. Jagannathan
*Attorney, Agent, or Firm*—Theodore V. Kawalchyn

[57] ABSTRACT

The present invention relates to hydrogenated block copolymers of butadiene and at least one other diene, preferably isoprene. The copolymer is hydrogenated and comprises at least 10% by weight of at least one crystallizable segment and at least one low crystallinity segment.

17 Claims, No Drawings

VISCOSITY MODIFIER POLYMERS

This is a continuation, of application Ser. No. 226,750, filed Apr. 12, 1994 abandoned which is a R60D of U.S. Ser. No. 668,653, f. Mar. 13, 1991 now U.S. Pat. No. 5,310,490.

BACKGROUND OF THE INVENTION

1. Field of the Invention

The present invention relates to hydrogenated copolymers of butadiene and at least one other diene, preferably isoprene. More particularly, it relates to block or segmented hydrogenated copolymer of butadiene and at least one other diene, preferably isoprene, containing at least one crystallizable segment or block comprising an average of at least about 10 weight percent of the total hydrogenated copolymer chain, and at least one low crystallinity segment or block. The instant invention also relates to oleaginous compositions containing said copolymers as viscosity index improver additives, a process for making these copolymers and a method to control the viscosity of oleaginous compositions.

2. Description of Related Art

Various copolymers of butadiene with other olefins are known to be used as oil additives. These include hydrogenated copolymers of butadiene with another conjugated diene such as isoprene. The copolymers are disclosed to be random or block copolymers. The following review of the related art illustrates attempts which have been made to develop hydrogenated butadiene base copolymers for use as an oil additive including a viscosity modifier.

U.S. Pat. No. 4,804,794 discloses segmented copolymers of ethylene and at least one other α-olefin monomer. Each copolymer is intramolecularly heterogeneous and intramolecularly homogeneous. At least one segment of the copolymer constituting at least 10% of the copolymer chain, is a crystallizable segment. The remaining segments of the copolymer chain are termed low crystallinity segments, and are characterized by an ethylene content of not greater than about 53 weight percent.

The α-olefin can include those containing 3 to 18 carbon atoms. α-olefins having 3 to 6 carbon atoms are indicated to be preferred. With the most preferred copolymers being copolymers of ethylene with propylene or ethylene with propylene and diene. The copolymers are disclosed to improve the properties in oleaginous fluids, in particular lubricating oil.

U.S. Pat. No. 3,419,365 discloses hydrogenated copolymers of butadiene and styrene as pour point depressants for distillate fuel oil; U.S. Pat. No. 3,393,057 discloses polymers of butadiene C10 to C24 normal alpha-monoolefins and styrene or indene as pour point depressants for fuel and lubricating oils; and U.S. Pat. No. 3,635,685 discloses pour point depressants comprising hydrogenated butadiene-styrene copolymers which contain a hydroxy, carboxy, or pyridyl terminal group.

U.S. Pat. No. 3,312,621 discloses polymers of conjugated diolefins which are predominantly in the 1,4-addition configuration, as viscosity index (V.I.) improvers. Butadiene, isoprene, 1,3-pentadiene, and copolymers of such diolefins are specifically disclosed as suitable.

U.S. Pat. No. 3,600,311 discloses viscosity index improvers of hydrogenated homopolymers of butadiene in which about 45 to 95 percent of the butadiene monomers are in the 1,4-configuration.

U.S. Pat. No. 3,795,615 discloses viscosity index improvers of hydrogenated copolymers of butadiene with a different conjugated diene, e.g., isoprene in which the monomer units in the polymer are predominantly in the 1,4-configuration.

U.S. Pat. No. 3,965,019 discloses hydrogenated random, tapered or block copolymers of butadiene and isoprene to be useful as viscosity modifiers.

U.S. Pat. No. 4,032,459 discloses a viscosity index improver comprising a copolymer of butadiene and isoprene having between 20–55% 1,4-configuration, this polymer then having been hydrogenated to remove substantially all of the olefinic unsaturation.

U.S. Pat. No. 4,073,737 discloses viscosity index improver comprised of a hydrogenated copolymer produced by copolymerization of from about 1 to about 10 mole percent butadiene, at least one other C5 to C12 conjugated diene, and up to 45 mole percent of a vinyl aromatic monomer.

A useful class of viscosity index improvers for lube oil compositions are star-shaped polymers comprising a nucleus such as divinylbenzene with polymeric arms linked to it. Such polymers are disclosed in patents, such as U.S. Pat. No. 358,565 and 4,620,048. Generally star-shaped polymers are disclosed to be formed by polymerizing one or more conjugated dienes and optionally, one or more monoalkenylarene compound in solution in the presence of an ionic initiator to form a living polymer. For the purpose of the present invention the term "living polymer" is used consistent with Billmeyer, *Textbook of Polymer Science*, 2d Ed., Wiley-Interscience, John Wiley and Sons, page 318, (1971). Specific conjugated dienes include conjugated dienes having 4 to 12 carbon atoms and optionally, one or more monoalkenylarene compounds. Typical and useful conjugated dienes include butadiene (1,3-butadiene) and isoprene. The living polymers thereby produced are then reacted with a polyalkenyl coupling agent to form star-shaped polymers. The coupling agents have at least two non-conjugated alkenyl groups. The groups are usually attached to the same or different electron drawing groups, e.g., an aromatic nucleus. Such compounds have the property that at least two of the alkenyl groups are capable of independent reaction with different living polymers, and in this respect, are different from conventional dienes polymerizable monomers, such as butadiene and isoprene. The coupling agents may be aliphatic, aromatic or heterocyclic. Examples of aliphatic compounds include polyvinyl and polyallyl acetylenes, diacetelenes, phosphates, and phosphites, as well as the dimethacrylates, e.g., ethyl dimethacrylate. Examples of suitable heterocyclic compounds include divinyl pyridine and divinyl thiophene. Coupling agents disclosed to be preferred in the U.S. Pat. No. 4,358,565 patent are polyalkenyl aromatic compounds with the most preferred being indicated to be polyvinyl aromatic compounds. Examples of such compounds include those aromatic compounds, e.g., benzene, toluene, xylene, anthracene, naphthalene, and durene which are substituted by at least two alkenyl groups, preferably directly attached thereto. Specific examples include polyvinyl benzenes, e.g., divinyl, trivinyl, and tetravinyl benzenes; divinyl, trivinyl and tetravinyl, ortho, meta and paraxylenes, divinyl naphthalene, divinyl ethyl benzene, divinyl biphenyl, diisobutenyl benzene, diisopropanol benzene, and diisopropanol biphenyl. It is disclosed that the polyalkenyl coupling agent should be added to the living polymer after the polymerization of the monomers is substantially complete, i.e., the agent should only be added after substantially all of the monomer has been converted to living polymer.

The amount of polyalkenyl coupling agent added may vary, but preferably, at least 0.5 moles is used per mole of unsaturated living polymer. Amounts from 1 to 15 moles, and preferably 1.5 to 5 moles are preferred.

There exists a need for viscosity index improvers which, when added to oleaginous compositions, such as lube oil compositions, yield compositions exhibiting better or improved low temperature viscometric characteristics than are obtainable by the use of conventional viscosity index improver additives. The copolymers of the instant invention provide oleaginous compositions exhibiting such improved low temperature viscometric characteristics, and additionally, improved shear stability.

For convenience, certain terms that are repeated throughout the present specification and claims are defined below.

a. Viscosity Index (V.I.) is the ability of a lubricating oil to accommodate increase in temperature with a minimum decrease in viscosity. The greater this ability, the higher the V.I.

b. A block copolymer is a copolymer having at least one sequence (also referred to as block or segment) of the same monomer units. Each sequence has at least two monomer units. Block copolymers typically have a plurality of each type of monomer making up the copolymer. The terms relating to block copolymer are consistent with those given in Billmeyer, Jr., *Textbook of Polymer Science, Second Edition*, Wiley-Interscience (1971).

c. Average methylene content of a segment of the hydrogenated copolymer is the average number of methylene moieties or units present in the segment. The methylene units are those present in the particular segment as a result of the polymerization and hydrogenation of butadiene and at least one other conjugated diene, such as isoprene. Thus, for example, the hydrogenation product of the 1,4-addition product of two butadiene molecules contains one methylene segment comprised of eight methylene units and has a methylene content of 100%, i.e., —CH$_2$—CH$_2$—CH$_2$—CH$_2$—CH$_2$—CH$_2$—CH$_2$CH$_2$—. The hydrogenation product of the 1,4-addition product of three isoprene molecules contains 9 methylene units, 3 substituted methylene units, includes two methylene sequences containing three methylene units each and one methylene sequence containing two methylene units, and has a methylene content of 75 mole percent, i.e.,

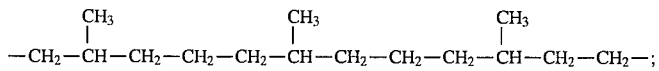

The hydrogenation product of the 1,4-addition product of one molecule of butadiene and one molecule of isoprene includes one methylene sequence comprised of 6 methylene units, contains 7 methylene units and one substituted methylene unit, and contains 87.5 mole percent methylene units, i.e.,

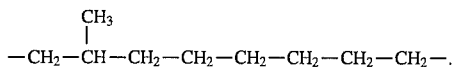

The following defines how percent methylene units are calculated from the percentages of hydrogenated 1,2 and 1,4 polybutadiene in the polymer. Each enchained 1,4-butadiene ($B_{1,4}$) unit contributes four methylenes. Each 1,2-butadiene contributes one methylene and one substituted methylene. Where B represents the mole fraction 1,4-butadiene then (1-B) is the fraction 1,2-butadiene. The mole fraction methylenes present, $X_{CH_2}$ is then $$x_{CH_2} = \frac{B+3}{4} \quad (1)$$

For the homopolymer polybutadiene, B=1 and the fraction $X_{CH_2}$=1. For a homopolymer of isoprene, B=0, and $X_{CH_2}$=0.75. If it is desired to interpret this composition in terms of ethene units $X_{CH_2CH_2}$ the result is $$x_{CH_2CH_2} = \frac{B+1}{2} \quad (2)$$

For B=1, $X_{CH_2CH_2}$=1 whereas for B=0, $X_{CH_2CH_2}$=½. A hydrogenated isoprene polymer is in effect an alternating ethene and propene copolymer. By definition hydrogenated isoprene methylenes are not considered to be ½ ethylene but only as supplying a single ethylene unit.

Depending on whether the butadiene is incorporated as blocks or as a statistical copolymer with the isoprene, different percentages of methylene units result in crystallinity.

In all cases where sequences of methylenes are long enough to crystallize at least two adjacent hydrogenated 1,4-butadiene units will be present, and generally 3 or more will be present. In such cases whether methylenes from isoprene are counted or not becomes less important, since isoprene adds only one or two units to an 8 to 12 unit sequence. For the purposes of the present invention the composition of crystallizable segments are considered to be in terms of butadiene content, with only those methylene segments contributed by butadiene units counted. Thus, $$X_{CH_2} = B \quad (3)$$

If there is no butadiene present there are no crystallizable methylenes. For B=1 all methylenes are crystallizable. For B=0.5 half the methylenes are crystallizable. As noted below, not all methylenes that are crystallizable will crystallize.

For a random copolymer of butadiene and isoprene about 3% of the methylenes present (from butadiene) will be in sequences of 20 or more at B=0.3; at B=0.4 about 9%; and at B=0.5 the value is about 19%. (C. Tosi, *Advances in Polymers Science*, 5, 451 (1968)).

For B=0.3, 0.4, 0.5, $X_{CH}$=0.82, 0.85, 0.875 respectively (Formula 1). It is through this region of butadiene composition, 30, 40 50%, that semi-crystalline polymers are formed in statistical copolymers.

For block as opposed to random copolymers lower amounts of butadiene are needed for crystallizable segments, and in a butadiene rich block the butadiene content can equal 100%. If the butadiene is mixed with isoprene in the crystallizable segment but is "blocked", then crystallinity could appear only marginally above the $X_{CH}$=0.75 value for hydrogenated polyisoprene given by formula (1).

The definitions above pertain to exclusive 1,4-butadiene monomer addition. In the case of 1,2- and 1,4-butadiene addition similar definitions can be made. Enchained 1,2-butadiene produces one methylene group and one substituted methylene. The overall mole fraction of methylene groups is $$x_{CH_2} = \frac{3B_{1,4} + 1}{2B_{1,4} + 2} \quad (4)$$

$B_{1,4}$ is the fraction of 1,4-addition of butadiene. For $B_{1,4}=1$, $X_{CH}=1$. For all 1,2-butadiene addition $X_{CH_2}=0.5$, there can be no long methylene sequences.

To obtain crystallizable sequences there must be sequences of 1,4-butadiene enchained units. For random addition of 1,2-butadiene and 1,4-butadiene units, $B_{1,4}$ is approximately 0.3 (i.e., 30 percent) to obtain crystallinity. From formula (4) $X_{CH_3}=0.73$ at $B_{1,4}=0.3$. If the statistical distribution of 1,2-butadiene and 1,4-butadiene additions is of a block type, then random crystallinity could occur at B1,4 below 0.3.

For polymers containing styrene or another monomer which introduce only two carbons to the polymer backbone, the methylene content can be reduced to only 0.5 mole fraction. Thus, for polymers containing such monomers or significant 1,2-butadiene addition or 3,4-isoprene addition, the percentage of methylene units present can be lower than 0.75. The precise sequence distribution determines the lower amount of methylene content that can be crystallizable. The fraction of methylenes present in the case of polymers containing 1,4- and 1,2-butadiene and 1,4- and 3,4-isoprene is $$x_{CH_2} = \frac{4B_{1,4} + B_{1,2} + 3I_{1,4} + I_{3,4}}{4B_{1,4} + 2B_{1,2} + 4I_{1,4} + 2I_{3,4}} \quad (5)$$

$B_{1,2}$ is the fraction of the total polymer formed from 1,2-addition of butadiene, $I_{1,4}$ the fraction of 1,4-addition isoprene; and $I_{3,4}$ the fraction of 3,4 addition of isoprene. $B_{1,4}$ is the most important variable for crystallizable methylenes.

The substituted methylene content is calculated as $$x_{CH_2} \text{ (substituted fraction)} = \frac{B_{1,2} + I_{1,4} + I_{3,4}}{2B_{1,2} + 4B_{1,4} + 4I_{1,4} + 2I_{3,4}}$$

where there is no $B_{1,4}$ or $I_{1,4}$ present this value can have a maximum of 0.5. When $B_{1,4}$ is less than 0.2 the substituted fraction is large.

d. By "crystallize" it is meant that the methylene sequences in the polymer associate into ordered state consistent with the classical definition of polymer crystallinity as set forth, for example, by Flory, *Principles of Polymer Chemistry*, Cornell University Press (1953).

e. Crystallizable units are defined as methylene groups in sequences which exhibit a heat of fusion when measured by differential scanning calorimetry (DSC) Upon cooling from the melt. In a useful procedure for the present invention a sample is formed into an approximately 0.030 inch thick sheet for 30 minutes at 150° C. and is then annealed at 20° C. for 48 hours prior to measurement, loaded into the calorimeter at that temperature, rapidly cooled to −100° C. and scanned to 150° C. at 20° C./minute. Only sequences melting between 20° C. and 140° C. are included.

f. The weight percent crystallizable units is:

$$\frac{\text{Heat of fusion measured cal/gm}}{69 \text{ cal/gm}} \cdot 100\%$$

On this basis pure melt crystallized polymethylene of high FUN (i.e., where the end group effects are not significant; typically greater or equal to about 20,000) has about 60% crystallizable units. Kinetic restrictions prevent them from all crystallizing. Percent crystallinity can be measured by techniques, as defined in G. Ver Strate, Z. W. Wilchinsky, *J. Pol. Sci Physics*, A2, 9, 127 (1971), which is incorporated herein by reference. The degree of crystallinity measured is a function of the sample's annealing history. Some low amount is desirable in this product when the sample is annealed at 20° C. for more than 48 hours after preparation of a void-free, strain-free specimen by heating to 150° C. for 30 minutes in a suitable mold. Crystallizability also depends on other factors: temperature, diluent, and the composition of the copolymer.

g. The association temperature ($T_a$), is the temperature at which crystallization of the copolymer of the present invention is determined by studying the temperature dependance of the relative viscosity ($\eta$rel). Deviation from an established ($d\eta$rel/dT) trend occurs when significant association at polymer segments due to crystallinity starts. (ASTM method D-445 for kinematic viscosity can be run at a series of temperatures. The polymer concentration in these measurements should be the same as that in the formulated oil, for example 1%).

h. The cloud point temperature is the temperature ($T_c$) at which crystalline clouds (turbidity) are first observable upon cooling of oil when tested according to ASTM D-2500. The cloud point temperature can be correlated with the association of temperature.

i. A crystallizable segment of the hydrogenated copolymer chain is rich in methylene units, with an average methylene content of at least about 75 mole percent. The methylene content depends on the comonomer used to prepare the polymer and the nature of their inclusion in the polymer. The methylene units will crystallize at a given temperature and concentration in solution only if they are in long enough sequences, with only a limited number of interruptions due to substituted methylene units. More interruptions are acceptable with methyl substitutions than with larger groups since methyl groups can enter the polymethylene crystal lattice. Methylene units can he identified by $C_{13}$ NMR, T. Hayashi, Y. Iroue, R. Chujo, *Macromolecules*, 21, 3139, 1988, and references therein. Sequences of 5 or more cannot be distinguished. However units are actually crystallizable only if they are present in sequences of about 11 methylenes or longer.

j. A low crystallinity segment has an average methylene content less than about 75 mole percent, and is characterized in the unoriented bulk state after at least 24 hours annealing by a degree of crystallinity of less than about 0.2% at 23° C.

k. Molecular weights of the hydrogenated copolymer were measured by a combination of gel permeation chromatography and on line laser light scattering as described in G. Ver Strate C. Cozewith, S. Ju, *Macromolecules*, 21, 3360, 1988. The specific refractive index increment in trichlorobenzene at 135° C. was assumed to be −0.104 for all hydrocarbon structures.

SUMMARY OF THE INVENTION

The present invention is directed to a hydrogenated block copolymer, a process to make the copolymer, compositions containing the copolymer and methods to use the copolymer.

The hydrogenated block copolymer of the present invention comprises monomeric units derived from butadiene, preferably 1,4-butadiene and at least one conjugated diene comonomer represented by the formula

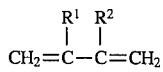

wherein $R^1$ is a $C_1$ to about $C_8$ alkyl radical and $R^2$ is hydrogen or $C_1$ to about $C_8$ alkyl radical. The copolymer comprises at least 10 percent by weight of the butadiene segments. The copolymer is hydrogenated and comprises at least ten percent by weight of at least one crystallizable segment comprised of methylene units. Correspondingly, the crystallizable segment has an average 1,4-polybutadiene content of at least about 20 mole percent and preferably at least 30 mole percent. The block copolymer has at least one low crystallinity segment comprised of methylene units and substituted methylene units and has an average 1,4-polybutadiene content of not greater than 20 mole percent and preferably less than 10 mole percent. A preferred block copolymer is where the copolymer is in a star copolymer form having from 4 to 25 and preferably 5 to 15 arms.

Preferably, the crystallizable segments have a number average molecular weight of at least 500. The average 1,4-polybutadiene content is at least 20 mole percent and preferably at least 50 percent of the methylene units are connected in series of at least 11 adjacent methylene units in length. The remaining segments of the copolymer chain are the low crystallinity segments preferably having an average 1,4-polybutadiene content of less than about 20 mole percent.

The most preferred hydrogenated block copolymer comprises a copolymer of butadiene and isoprene having at least 10 weight percent of a crystallizable segment which comprises at least 20 mole percent of 1,4-polybutadiene, and at least 10 weight percent of a low crystalline segment having an average 1,4-polybutadiene content of less than about 20 mole percent.

The present invention includes compositions comprising oleaginous compounds and the above recited hydrogenated block copolymer. Preferably the oleaginous component is an oil composition comprising oil, such as lubricating oil. Typically, the oleaginous composition comprises from 0.1 to 50, preferably from 0.05 to 25 percent by weight of the hydrogenated copolymer of the present invention. Preferred compositions of the present invention comprise copolymer as recited above having a crystallization temperature ($T_a$) and oil having a cloud point temperature ($T_c$), where ($T_a$) is greater than ($T_c$). The lubricating oil compositions can contain additional additives, such as other viscosity modifiers, ashless dispersants, antioxidants, corrosion inhibitors, detergents, pour point depressants, antiwear agents, and the like.

The copolymers have been found to impart excellent low temperature viscometric properties to oleaginous fluids, particularly lubricating oils. The compositions have satisfactory viscosities at room temperatures and at higher temperatures. The compositions of the present invention are useful for typical lubricating oil compositions such as automatic transmission fluids, heavy duty oil suitable for use in crankcases of gasoline and diesel engines, and any machinery containing gears and power transmitting units.

The present invention additionally comprises a process to make the hydrogenated block copolymer recited above. The process comprises the steps of polymerizing a precursor block copolymer comprising at least one butadiene segment comprising monomeric unit derived from butadiene, preferably at least 20 percent by mole of 1,4-butadiene, and at least one comonomer segment comprising comonomer units derived from at least one conjugated diene comonomer represented by the formula:

$$\begin{array}{cc} R^1 & R^2 \\ | & | \\ CH_2=C-C=CH_2 \end{array}$$

wherein $R^1$ and $R^2$ are defined above. The process further comprises substantially hydrogenating the precursor copolymer to form the above recited hydrogenated block copolymer. The process is preferably an anionic polymerization. In forming the precursor block copolymer the polymerization process preferably takes either of two approaches. The first is to homopolymerize butadiene to form butadiene segments. The comonomer is then added to the reacted mass of butadiene and polymerized in the presence of the butadiene segments to form the precursor block copolymer. Alternatively, the comonomer can first be homopolymerized followed by the addition of butadiene to the comonomer segments. The butadiene is polymerized in the presence of the comonomer segments. Upon completion of the polymerization of the butadiene additional comonomer can be added and polymerized to form the precursor block copolymer.

DETAILED DESCRIPTION OF THE INVENTION

The present invention is directed to hydrogenated block copolymers comprised of butadiene and at least one comonomer of a $C_5$ to about $C_{24}$ diene. The comonomer can comprise anionically polymerizable substituted ethylene, such as styrene or methacrylates. The copolymer contains at least one crystallizable segment or block and at least one low crystallinity segment or block. The hydrogenated copolymers are made by first polymerizing, preferably by addition polymerization, monomers of butadiene and at least one ether diene, preferably isoprene, to form a precursor copolymer containing an amount of polymerized 1,4-butadiene and at least one other diene which upon hydrogenation of the precursor copolymer is effective to form a hydrogenated copolymer containing at least one crystallizable segment and at least one low crystallinity segment. The precursor copolymer is then hydrogenated to substantially saturate the olefinic bonds and to form a hydrogenated copolymer containing at least one crystallizable segment and at least one low crystallinity segment. The crystallizable segment comprises at least an average of about 10 weight percent of the hydrogenated copolymer chain and contains an average 1,4-polybutadiene content of at least about 20 mole percent, preferably at least about 30 mole percent. An adequate percent of the methylene units are joined in sequences containing at least about 11 methylene units to permit crystallization.

The low crystallinity segment has an average 1,4-polybutadiene content of less than 30 mole percent, preferably less than about 20 mole percent, and rich in substituted methylene units. The low-crystallinity segment correspondingly contains an average of at least about 22 mole percent, more preferably at least about 24 mole percent substituted methylene units. The substituted methylene units are represented by the formula

wherein R is a $C_1$ to about $C_8$ alkyl group, either branched or straight chain. These substituted methylene units result from, for example, the hydrogenation of 1,2-addition butadiene and the hydrogenation of the polymerization products of the other dienes such as isoprene. Thus, for example, hydrogenating the polymerization product of 1,4-addition isoprene yields the recurring structural unit

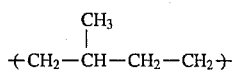

containing the substituted methylene unit

.

The low crystallinity segment can contain, in addition to the hydrogenated comonomer diene polymerization products, hydrogenated 1,2-addition butadiene as well as hydrogenated 1,4-addition butadiene polymerization products. Thus, for example, the low crystallinity segment may contain the hydrogenated polymerization products of 1,4-butadiene, i.e., hydrogenated poly-1,4-butadiene, 1,2-butadiene, i.e., poly-1,2-butadiene, and isoprene, i.e., hydrogenated polyisoprene.

The copolymer may also optimally contain the hydrogenated polymerization product of other monomers such as, for example, monovinyl arenes such as styrene or substituted styrene, methacrylates, vinyl pyridines or other anionically polymerizable monomers.

The size of the crystallizable segment which is present in the hydrogenated copolymer is in general dependent upon the relative amounts of 1,4-butadiene and at least one other diene present in the precursor polymer. The crystallizable segment comprises at least about 10 weight percent, preferably from about 10 to about 90 weight percent, more preferably from about 20 to about 85 weight percent, and most preferably from about 40 to 65 weight percent of the total hydrogenated copolymer chain. Correspondingly, the precursor copolymer contains at least about 10 weight percent, preferably at least about 20 weight percent (e.g., from about 25 to about 60), and more preferably at least about 35 weight percent of 1,4-butadiene. Generally, the greater the amount of 1,4-butadiene present in the precursor copolymer, the larger the crystallizable segment in the hydrogenated copolymer.

In order to attain the preferred hydrogenated copolymer comprising copolymer chains containing at least one crystallizable segment comprised of methylene units and at least one low crystallinity segment comprised of methylene units and substituted methylene units, the monomers preferably include sufficient 1,4-butadiene.

Not all of the 1,4-butadiene present in the precursor copolymer forms (upon hydrogenation) the crystallizable segment. Some of the hydrogenated 1,4-butadiene may be present in the low crystallinity segment. Thus, for example, the low crystallinity segment may comprise the hydrogenation products of isoprene (either 1,4- or 3,4-addition polyisoprene), 1,4-addition butadiene, and 1,2-addition butadiene.

The crystallizable segment can also contain some of the hydrogenation product of 1,2-butadiene, isoprene (1,4- and/or 3,4-), etc., provided the amounts of those other hydrogenated moieties are insufficient to lower the average 1,4-polybutadiene content of the crystallizable segment below about 20 mole percent.

Copolymers, preferably produced by anionic polymerization followed by hydrogenation of butadiene and a conjugated diene comonomer are preferably comprised of the hydrogenated reaction products of butadiene and isoprene wherein the 1,4-configuration species predominate. However, other species, such as those obtained from 1,2- and/or 3,4-addition may also be present in the polymer. Thus, for example, the 1,2-addition of butadiene will yield a recurring structure represented by the formula

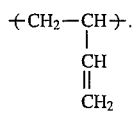

Hydrogenation of this structure results in a structure represented by the formula

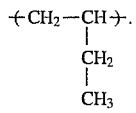

Therefore, a hydrogenated copolymer of butadiene and isoprene may contain, for example, the following species:

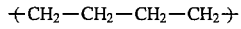

obtained from the hydrogenation of 1,4-butadiene;

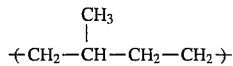

obtained from the hydrogenation of 1,4-isoprene;

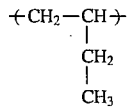

obtained from the hydrogenation of 1,2 addition butadiene; etc.

The recurring structural units other than those obtained by the hydrogenation of the 1,4-addition of butadiene and isoprene may be present in both the crystallizable and low crystallinity segment. If they are present in the crystallizable segment, however, they are present in amounts which are insufficient to affect the crystallizable characteristics of said segment.

The at least one other monomer, other than butadiene, which is utilized to form the copolymers of the instant invention is preferably a $C_5$–$C_{24}$ conjugated diolefin or substituted ethylene such as styrene. Preferred conjugated diolefins may be represented by the formula

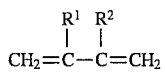

wherein $R^1$ is a $C_1$ to $C_8$ alkyl group, and $R^2$ is hydrogen or independently $C_1$ to about $C_6$ alkyl group. The alkyl groups represented by $R^1$ and $R^2$ may be straight chain or branched. It is generally preferred that the alkyl groups represented by $R^1$ and $R^2$ are straight chain alkyl groups. Preferred conjugated diene monomers are those represented by the formula

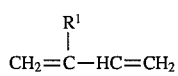

wherein $R^1$ is as defined above. The more preferred conjugated diene monomer is isoprene.

The crystallizable segments or blocks present in the hydrogenated copolymer are comprised predominantly of methylene units which are, inter alia, provided by the hydrogenation of the 1,4-butadiene present in the precursor copolymer. Thus, polymerizing butadiene monomer, i.e., $CH_2=CH-CH=CH_2$, by 1,4 addition yields a precursor polymer segment containing recurring structural unit of the formula:

$$+CH_2-CH=CH-CH_2+$$

Hydrogenating this precursor polymer chain yields a polymer segment containing the following recurring structural unit $$+CH_2-CH_2-CH_2-CH_2+$$

i.e., containing only methylene units. This recurring structural unit, provided it is sufficiently long, e.g., contains at least about 11 methylene units, forms the crystallizable segment of the polymer chain.

Thus, there are two requirements that must be fulfilled in order for a segment to be crystallizable. The first requirement is that the segment have an average 1,4-polybutadiene content of at least about 20 mole percent, preferably at least about 30 weight percent (e.g., from about 20 to about 80 mole percent). The second is that the methylene units be in sequences sufficiently long to impart crystallinity to said segment. Generally, these sequences are at least 11 methylenes or longer, preferably at least 15 methylenes or longer, and more preferably at least about 19 methylenes or longer.

A preferred copolymer of the instant invention is a hydrogenated butadiene-isoprene copolymer in which the dienes, i.e., butadiene and isoprene, are predominantly in the 1,4-configuration in the precursor copolymer. Generally, at least about 20 mole percent of the butadiene and isoprene are in the 1,4-configuration in the precursor polymer. The precursor copolymer contains at least an amount of butadiene units in the 1,4-configuration sufficient to provide a hydrogenated copolymer containing at least one crystallizable segment comprising at least about 20 weight percent of said hydrogenated copolymer.

The following discussion will be in terms of the preferred hydrogenated butadiene-isoprene copolymer. The crystallizable segments referred to hereinafter are generally derived from the hydrogenation of the 1,4-configuration butadiene monomers, while the low crystallinity segments are derived from the hydrogenation of the precursor copolymer segments containing isoprene in the 1,2-, 3,4- and 1,4-configuration as well as butadiene in the 1,4- and 1,2-configuration.

Polymerizing isoprene monomer and butadiene monomer by 1,4-addition yields a precursor polymer chain containing the following recurring structural units $$+CH_2-\underset{\underset{CH_3}{|}}{C}=CH-CH_2+; \text{ and} \qquad \text{I.}$$

$$+CH_2-CH=CH-CH_2+ \qquad \text{II.}$$

Hydrogenating this precursor polymer yields a hydrogenated polymer chain containing the following recurring structural units $$+CH_2-\underset{\underset{CH_3}{|}}{CH}-CH_2-CH_2+; \text{ and} \qquad \text{Ia.}$$

$$+CH_2-CH_2-CH_2-CH_2+ \qquad \text{IIa.}$$

Recurring structural unit Ia contains three methylene units and a substituted methylene unit, i.e., $$-\underset{\underset{CH_3}{|}}{CH}-.$$

Where there are relatively large amounts of these substituted methylene moieties in a polymer segment, generally greater or equal to about 22 mole percent, the resulting hydrogenated polymer segment is a low crystallinity segment. The segment containing at least about 20 mole percent 1,4-polybutadiene units, and if these methylene segments are of sufficient length, is a crystallizable segment.

A segment containing the recurring unit $$+CH_2-\underset{\underset{CH_3}{|}}{CH}-CH_2-CH_2-CH_2-\underset{\underset{CH_3}{|}}{CH}-CH_2-CH_2-CH_2-CH_2-CH_2-CH_2+,$$

derived from the hydrogenation of the 1,4-addition product of two moles of isoprene for every mole of butadiene, will generally not be a crystallizable segment because it is relatively rich in substituted methylene units, and the methylene sequences are not sufficiently long. A segment containing the recurring structural unit $$+CH_2-\underset{\underset{CH_3}{|}}{CH}-CH_2-CH_2-CH_2-CH_2-CH_2-CH_2-CH_2-CH_2-CH_2-CH_2+,$$

derived from the hydrogenation of the 1,4-addition of two moles of butadiene for every mole of isoprene, will be a crystallizable segment since it contains at least 30 mole percent 1,4-polybutadiene units, and since it contains uninterrupted methylene sequences containing at least about 11 methylene units.

The copolymers of this invention will contain at least one crystallizable segment rich in methylene units (hereinafter called an "M" segment) and at least one low crystallinity segment relatively rich in substituted methylene units (hereinafter called a "T" segment). The copolymers may be therefore illustrated by copolymers selected from the group consisting of copolymer chain structures having the following segment sequences:

T—M (III)

-continued $$T_1-(M_1-T_2)_x-M_2-T_3, \text{ and} \qquad (IV)$$

wherein M and T are defined above, $M_1$ and $M_2$ can be the same or different and are each M segments, $T_1$, $T_2$ and $T_3$ can be the same or different and are each T segments, and x is an integer of from 0 to 3.

When x=0, the copolymer's M, i.e., $M_2$ segment is positioned between two T segments, and the M segment can be positioned substantially in the center of the polymer chain (that is, the $T_1$ and $T_3$ segments can be substantially the same molecular weight and the sum of the molecular weight of the $T_1$ and $T_3$ segments can be substantially equal to the molecular weight of the $M_2$ segment), although this is not essential to the practice of this invention. Preferably, the copolymer will contain only one M segment per chain. Therefore, structures III and IV (x=0) are preferred, with structure IV being more preferred.

The preferred copolymer chain structures, from the standpoint of providing oleaginous compositions such as lube oil compositions have excellent low temperature viscometric properties.

Preferably, the M segments and T segments of the copolymer are located along the copolymer chain so that only a limited number of the copolymer chains can associate before the steric problems associated with packing the low crystallinity T segments prevents further agglomeration. Therefore, in a preferred embodiment, the M segment is located near the center of the copolymer chain and only one M segment is in the chain. In the case where x is one or larger it is important that the $T_1$ and $T_3$ segments be sufficiently large to prevent association of the M segments from different polymer chains.

Generally, copolymers of the structure $$M_1\text{-}(T\text{-}M_2)_z \qquad (V)$$

wherein $M_1$, $M_2$ and T are as defined above, and wherein z is an integer of at least 1, are undesirable as viscosity modifier polymers. Solutions of structure V copolymers in oil tend to gel even when the M and T portions have exactly the same composition and molecular weight as structure IV copolymers (with x=z=1). It is believed this poor viscosity modifier performance is due to the inability of a center T segment to sterically stabilize against association.

The M segments of the copolymers of this invention comprise the 1,4-addition product of butadiene which has been hydrogenated, but can also comprise at least one other hydrogenated diolefin monomer, provided the 1,4-polybutadiene content of said M segment is at least about 30 mole percent and a majority of the methylene sequences are sufficiently long, e.g., contain at least about 11 methylene units. The T segments comprise a mixture of hydrogenated butadiene, either in the 1,2-configuration or the 1,4-configuration and at least one other conjugated diolefin, or at least one conjugated diene other than 1,4-addition butadiene, and have a 1,4-polybutadiene content not greater than about 20 mole percent. The $T_1$ and $T_2$ segments can contain amounts of hydrogenated 1,4-configuration butadiene monomers, i.e., methylene units, provided the total 1,4-polybutadiene content of said segments does not exceed about 20 mole percent.

A preferred embodiment, a hydrogenated block or segmented copolymer of butadiene and at least one other conjugated diene, preferably isoprene contains at least one crystallizable block or segment and at least one non-crystallizable block or segment. Such block or segment copolymers may be represented by formula IV described hereinbefore, i.e., $T_1$-$(M_1$-$T_2)_x$-$M_2$-$T_3$ wherein $M_1$, $M_2$, $T_1$, $T_2$, $T_3$ and x are as defined hereinbefore. Preferably, $M_1$ and $M_2$ are comprised predominantly or solely of methylene units derived from homopolymerized butadiene substantially in the 1,4-configuration which has subsequently been hydrogenated. $T_1$, $T_2$ and $T_3$ contain adequate substituted methylenes to render the segments of low crystallinity and may generally be derived, in one embodiment of the instant invention, from homopolymerized isoprene which has been hydrogenated. Such block copolymers may be prepared by sequential addition and homopolymerization of different diene monomers, e.g., isoprene and butadiene. Thus, for example in forming a block copolymer of the structure $T_1$-$M_2$-$T_3$, isoprene monomer is first homopolymerized, substantially by 1,4-addition, with some residual fraction of 3,4-addition, to form a precursor copolymer $T_1'$ segment containing a recurring structure represented by the formula

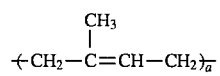

wherein "a" is a number of at least 1. Upon hydrogenation this structure becomes

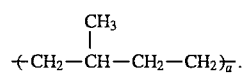

Upon complete or substantially complete homopolymerization of the isoprene reactant, butadiene monomer is introduced into the reactor vessel containing the "living" isoprene segment. The butadiene is homopolymerized, substantially via 1,4-addition (generally there may be some fraction of 1,2-butadiene addition, although this may be kept to a minimum by appropriate reaction conditions well known in the art), to form a precursor copolymer segment M' containing a recurring structure represented by the formula

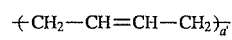

wherein "a'" is a number of at least 1. Upon hydrogenation this structure becomes

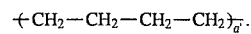

Upon completion or substantial completion of homopolymerization of the butadiene, isoprene monomer is again introduced into the reaction vessel containing the precursor block copolymer $T_1'$-$M_2'$-, with $M_2'$ being the "living" butadiene block. The isoprene is homopolymerized to form precursor copolymer segment $T_3'$ containing the same recurring structure as precursor copolymer segment $T_1'$. The precursor copolymer containing segments $T_1'$-$M_2'$-$T_3'$ is then hydrogenated to form hydrogenated copolymer of structure $T_1$-$M_2$-$T_3$.

The present invention relates to novel segmented hydrogenated copolymers of butadiene and at least one other conjugated diene monomer wherein the copolymer's chain contains at least one crystallizable segment rich in methylene units and at least one low crystallinity segment relatively rich in substituted methylene units, wherein the low crystallinity copolymer segment is characterized in the unoriented bulk state after at least about 48 hours annealing at 23° C. by a degree of crystallinity of less than about 0.2% at 23° C., and wherein the copolymer's chain is intramolecularly heterogeneous. The crystallizable segments comprise an average of from about 20 to 90 weight percent, preferably from about 25 to 85 weight percent, and more preferably from about 30 to about 80 weight percent of the total copolymer chain, and contain an average 1,4polybutadiene content which is at least about 20 mole percent, preferably at least about 30 mole percent. The low crystallinity copolymer segments comprise an average of from about 80 to 10 weight percent, preferably from about 75 to 15 weight percent, and more preferably from about 70 to 20 weight percent of the total copolymer chain, and have a 1,4-polybutadiene content not greater than about 20 mole percent. The copolymers in accordance with the present invention comprise intramolecularly heterogeneous chains, with substantially each chain containing both crystallizable and low crystallinity segments.

The hydrogenated copolymers of the instant invention have weight-average molecular weights ($\overline{Mw}$) as low as about 2,000. The preferred minimum is about 10,000. The more preferred minimum is about 20,000. The maximum weight-average molecular weight can be as high as 2,000,000. The preferred maximum is about 500,000. The more preferred maximum is about 250,000. The M segments have a $\overline{Mw}$ of from about 1,000 to about 1,000,000, preferably from about 10,000 to about 2,000,000, and more preferably about 20,000 to about 100,000. The T segments have a $\overline{Mw}$ of from about 1,000 to about 1,000,000, preferably about 5,000 to about 200,000, and more preferably from about 10,000 to about 100,000. The weight average molecular weights are determined by gel permeation chromatography (GPC) using tetrahydrofuran (THF) and light scattering as discussed above.

The copolymers of the instant invention have a molecular weight distribution ($\overline{MW}/\overline{Mn}$) of about 2.0 or less, preferably about 1.9 or less, and more preferably about 1.8 or less, as determined by GPC as discussed in G. Ver Strate, C. Cozewith, S. Ju, in *Macromolecules*, 21, 3360, 1988.

It is believed the novel copolymer's improved function as viscosity modifiers can be at least partially attributed to the ability of a controlled portion of the copolymer's molecules to crystallize in oleaginous compositions such as lubricating oils at temperatures above the cloud point of the lubricating oil. This occurs both inter- and intra-molecularly.

Typical lubricating oil contains paraffinic and isoparaffinic waxy components which are capable of crystallizing. As the lubricating oil is cooled from high temperatures (above $T_c$), these waxy components begin to crystallize. When the crystals become large they scatter light and make the oil turbid (the cloud point, $T_c$). Below the cloud point, waxes in the oil can co-crystallize with the crystallizable viscosity modifier crystallizable segments, effectively crosslinking the viscosity modifier polymer molecules, resulting in high "effective" polymer molecular weights, or causing "gelation" of the oil. This is observed by the appearance of a yield stress upon shearing. Such effectively high molecular weights are undesirable, as they increase the oil viscosity at low temperatures making it difficult for the oil to be pumped or poured.

The associated copolymer molecules of this invention are believed to have a smaller effective hydrodynamic volume per molecule than in their unassociated state, which lowers the relative viscosity of the lubricating oil solution thereof and provides low formulated oil viscosities at low temperatures. It is believed the copolymer's characteristics of exhibiting a higher polymer association temperature than the oil's cloud point minimizes interaction with the wax in the oil and accordingly decreases the tendency of oils to undergo gelation. Also, only a portion of these copolymer molecules is crystallizable under the use conditions. The non-crystallizable portion is believed to act as a steric barrier to help prevent excessive intermolecular association. The controlled segmented nature of the polymers is essential to their performance.

If the polymer has already associated above the cloud point temperature, the polymer and wax have little opportunity to interact. Furthermore, if the polymer contains segments which are low enough in methylene to completely avoid crystallization and are properly located along the contour, these will act as steric blocks to wax or excessive polymer/polymer interaction. Thus, two polymer characteristics are needed: crystallization above the wax appearance temperature and a segmented structure to stabilize agglomeration before gels form.

The copolymers of the present invention are preferably prepared by anionic polymerization. This method of polymerization offers certain unique advantages which makes it extremely useful in the synthesis of the polymers of the present invention. In particular, by the use of anionic polymerization, it is possible to obtain polymers having a narrow molecular weight distribution, to obtain tapered or block polymers, and to control the structure of the polymers derived from conjugated dienes.

Unlike free-radical polymerization reactions, anionic polymerizations can be performed where there is no facile chemical termination step. Of course, termination reactions do occur, but under carefully selected conditions with the monomers of the present invention, using inert solvents and highly pure reactants, the end groups have indefinite lifetimes. The non-terminated chains derived from anionic homopolymerization can be used for the synthesis of block polymers by sequential addition of different monomers as described hereinbefore. Thus anionic polymerization offers flexibility in allowing either block or tapered polymers to be readily produced. As mentioned hereinbefore polymers with narrow molecular weight distribution having better shear stability than those with broader distributions can be produced. Shear stability is a desirable property in polymers used as viscosity index improvers.

Anionic polymerization generally offers a wider latitude of techniques for producing varied structures of conjugated diolefin polymers. With diene monomers, 1,4- and 1,2- addition can be regulated by the appropriate combination of reaction conditions, i.e., catalyst, solvent type, and temperature. Hydrogenated precursor copolymers containing butadiene units predominantly in the 1,4-configuration are much more effective in increasing the V.I. than hydrogenated precursor copolymers containing butadiene units predominantly in the 1,2-configuration.

The polymers of the present invention can be prepared with known metallic and organometallic catalysts such as lithium metal or sodium metal and organo-lithium or organosodium catalysts. Preferred lithium compounds are compounds containing two lithium atoms per compound molecule and include $LiR_LLi$ wherein $R_L$ is an organic compound, preferably a hydrocarbon having at least one carbon atom and preferably from 3 to 6 carbon atoms. Useful dilithium (DiLi) compounds are disclosed in A. F. Halasa et al. *Organolithium Catalysis of Olefin and Diene Polymerization*, Advances in Organometallic Chemistry, Vol. 18, pages 55–97, Academic Press, Inc. (1980). Suitable organo-lithium catalysts may be represented by the formula $R^2Li$ wherein $R^2$ is a $C_3$ to $C_{30}$, and preferably $C_3$ to $C_{10}$ alkyl, aralkyl, or cycloalkyl group. Specific examples of suitable catalysts include n-propyllithium, isopropyllithium, n-butyllithium, tertiarybutyllithium, n-decyllithium, benzyllithium, 4-phenyl-n-butyllithium, etc. Particularly preferred are the butyllithiums, i.e., normal-, sec-, iso-, and tertiarybutyllithiums.

An inert diluent, in which the catalyst is soluble, may be employed. By "inert" it is meant that the diluent does not react, although the nature of the solvent may affect the relative amount of 1,2- and 1,4-configuration that is obtained. The inert diluent will generally be a hydrocarbon free of olefinic unsaturation containing from 3 to 16 carbon atoms. Suitable inert diluents include aliphatics, such as n-pentane, n-hexane, isooctane, n-nonane, etc.; alicyclics, such as cyclopentane, cyclohexane, cycloheptane, etc., aromatics such as benzene, toluene, xylene, chlorobenzene, etc. The amount of diluent employed in the preparation is not critical, except that sufficient amounts should be used to solubilize the amount of organolithium catalyst used. Generally, 0.5 to 200, preferably 1 to 50 liters of the diluent per gram mole of organo-lithium catalyst are employed during the preparation of the polymer.

The amount of catalyst employed primarily depends upon the degree of polymerization desired. The term "degree of polymerization," as employed herein, means the total number of monomeric units present in the polymer. Ordinarily, each mole of organo-lithium catalyst will generate a mole of polymer. Thus, "degree of polymerization" may be conveniently defined by the generalization:

$$\text{Degree of polymerization} = \frac{\text{total moles of monomer}}{\text{moles of organo-lithium catalyst}}$$

Since to obtain the desired molecular weights, the average number of monomeric units in the polymer will generally be from about 500 to about 10,000. About 0.0001 to 0.002 mole of organolithium catalyst per mole of monomer will ordinarily be utilized.

The polymerization reaction generally takes place at about −50° to about 150° C., and preferably at 20° to 60° C. Reaction times as short as 1 minute or as long as 75 hours may be employed. Preferably, the polymerization reaction is carried out for from 4 minutes to 24 hours. Reaction pressure is not critical; pressures may range from atmospheric to super-atmospheric. Preferably for economy and ease of handling, atmospheric pressure is utilized.

In one embodiment the monomers are added sequentially whereby block or segment copolymers may be obtained. For example in the preparation of a copolymer of structure III, i.e., T–M, one of the monomers, e.g., butadiene, is homopolymerized in the presence of the catalyst via 1,4-addition for a period of time, e.g., 2 hours, to form a unhydrogenated precursor copolymer segment M' containing at least about 65 weight percent butadiene in the 1,4-configuration. Then the second monomer, e.g., isoprene, is added to the reaction solution and homopolymerized, preferably via 1,4-addition, to form a unhydrogenated precursor segment T' containing isoprene in the 1,4-configuration. The segmented copolymer is then hydrogenated to form methylene rich segment M, corresponding to a 1,4-polybutadiene content of at least about 20 mole percent, and substituted methylene rich segment T having a methylene content corresponding to 1,4-polybutadiene of less than about 20 mole percent.

A hydrogenated copolymer having structure IV, i.e., $T_1$-$M_2$-$T_3$, can be prepared by first homopolymerizing isoprene, preferably by 1,4-addition, to form unhydrogenated precursor segment $T_1$' containing predominantly 1,4-configuration isoprene units; introducing butadiene monomer into the reactor containing the unhydrogenated precursor segment $T_1$' and homopolymerizing the butadiene via 1,4-addition mechanism to form unhydrogenated precursor segment $M_2$' containing at least about 20 mole percent of 1,4-configuration butadiene; and then introducing additional isoprene into the reactor and homopolymerizing said isoprene via 1,4-addition to form unhydrogenated precursor segment $T_3$' containing predominantly 1,4-configuration isoprene. The segmented copolymer $T_1$'-$M_2$'-$T_3$' is then hydrogenated to form the $T_1$-$M_2$-$T_3$ structure.

In the foregoing discussion concerning the preparation of copolymers of structures M-T and $T_1$-$M_2$-$T_3$ it is to be understood that the M segment need not contain, and usually does not contain, only methylene units derived from the hydrogenation of 1,4-addition butadiene. It may also contain some substituted methylene units derived from the hydrogenation of the 1,2-addition butadiene and/or isoprene, so long as those substituted methylene units do not exceed about 80 mole percent of the total units. Likewise, segments T, $T_1$ and $T_3$ may contain, and usually do contain, methylene units derived from the hydrogenation of 1,4-addition butadiene, so long as the total methylene units present in T, $T_1$ and $T_3$ do not correspond to a 1,4-polybutadiene content exceeding 20 mole percent.

An alternate and preferred embodiment of the present invention is one wherein the copolymer is in a star polymer form, i.e., a star block copolymer. A living block copolymer of butadiene and isoprene is formed as recited above. The copolymer has the above structures of T-M and $T_1$-$M_2$-$T_3$. When the copolymer reaches a desired molecular weight a polyalkenyl coupling agent is introduced. The polyalkenyl coupling agent acts as a nucleus of the star. The living polymers react at one end with the polyalkenyl coupling agent. The living polymer is then deactivated or killed in a known manner. Each arm of the star is thereby attached at one end to the nucleus with the opposite end preferably being a "T" segment. That is, the free ends of the arms of the star are preferably rich in substituted methylene units making them amorphous.

Each arm of the star preferably has the character of the straight chain copolymer from which it forms. For the purposes of the present invention the term block copolymer will therefore include star copolymers containing arms which have blocks consistent with the straight chain block copolymers recited above. Preferred molecular weights for star polymers are higher than their linear counterparts.

Apart from the specific and improved character of the block copolymer structure of the arms, the star polymers of the present invention are made in accordance with procedures disclosed in patents such as U.S. Pat. No. 4,358,565 and U.S. Pat. No. 4,620,048. The improvement of the star copolymer of the present invention being that it is a copolymer having arms wherein there are sharp blocks characterized by their amorphous and crystalline properties. The configurations having methylene rich groups at the arms of the stars near the star center are useful in lubricating oils which contain paraffin and isoparaffinic waxy components capable of crystallizing to prevent crystalline gelling.

More particularly, the star polymers of the present invention are made by forming block copolymers as recited above. The block copolymers have a structure as presented in formulas III, and IV with the structure of III being most preferred. The living block copolymer is first prepared by copolymerizing blocks of isoprene and butadiene as recited above.

In a preferred method, the living block copolymers produced are reacted with a polyalkenyl coupling agent such as polyalkenyl compounds or halosilane compounds such as $SiCl_4$. Such polyalkenyl coupling agents capable of forming star-shaped polymer are known and indicated to be disclosed in polymers such as in U.S. Pat. No. 3,985,830.

The polyalkenyl coupling agent should be added to the living polymer after the polymerization of the monomers is substantially complete, i.e., the agent should only be added after substantially all of the monomers (formulas I and II) have been converted to the living block copolymer.

The amount of polyalkenyl coupling agent added is preferably at least 0.5 moles per mole of unsaturated living polymer. Amounts of from 1 to 15 moles, preferably 1.5 to 5 moles are preferred. The amount which may be added in two or more stages is usually such so as to convert at least 80–85 weight percent of the living polymers into star-shaped polymers.

The reaction between the living polymer and the polyalkenyl coupling agent or nucleator can be carried out in the same solvent as the reaction to form the living polymer. The reaction temperature can also be varied from 0° to 150° C., and preferably 20° to 120° C. The reaction may also take place in an inert atmosphere such as nitrogen under pressure of from 0.5 to 10 bars.

The star-shaped polymers prepared are characterized by having a dense center nucleus of crosslinked polyalkenyl coupling agent and a number of arms of substantially linear unsaturated polymers extending outwardly therefrom. The number of arms may vary considerably, but is typically from 4 and 25, preferably from 5 to about 15, and most preferably from 5 to 10 arms. It is reported that the greater number of arms employed improves both thickening efficiency and shear stability of the polymer since it is possible to prepare a viscosity index improving molecule having a high molecular weight (resulting in increased thickening efficiency) without the necessity of excessively long arms.

The star-shaped polymers, which are still living, may be deactivated or killed in a known manner by the addition of a second compound which reacts with the carbon-ionic end group. Examples of suitable deactivators include compounds with one or more active hydrogen such as water, alcohol, such as methanol, ethanol, isopropanol, 2-ethylhexanol, or carboxylic acids such as acetic acid, compounds with one active halogen atom, such as chlorine atoms (benzyl chloride or fluoromethane), compounds with one ester group and carbon dioxide. If not deactivated in this way, the living star-shaped polymers will be killed by the hydrogenation step. Before being killed, the living star-shaped polymers may be reacted with further amounts of monomers, such as the same or different dienes, or functional monomers.

The molecular weights of the star-shaped polymer to be hydrogenated may vary between relatively wide limits. However, they are typically between molecular weights from about 25,000 to 1,500,000, and preferably from 100,000 to 500,000. The molecular weights are weight average molecular weights determined by gel permeation chromatography.

The hydrogenation of the polymers of the present invention is carried out using conventional hydrogenation procedures. The polymer is diluted with an inert solvent, such as those previously mentioned, or in the original polymerization medium, and the polymer solution and hydrogenation catalyst are added to a high pressure autoclave. The autoclave is pressured with hydrogen to about 100 to 3,000 p.s.i.g., and then heated to 50° to 220° C., (preferably 75° to 150° C.), for about 0.1 to 24, preferably 1 to 24 hours (preferably 2 to 10 hours), while mixing. The reactor is then depressurized, the catalyst removed by filtering, and the hydrogenated polymer recovered from the solvent by conventional stripping procedures.

The hydrogenation catalyst will generally be used in an amount of 0.1 to 20 weight percent based upon the eight of the polymer to be hydrogenated. The specific amount of catalyst employed depends somewhat upon the specific catalyst used. Any material functioning as an olefin hydrogenation catalyst can be used; suitable catalysts include Raney nickel, platinum oxide, platinum on alumina, palladium or charcoal, copper chromate, nickel supported on kieselguhr, molybdenum sulfide, and the like. The best hydrogenation results were obtained with Raney nickel, in large excess, at high temperatures and pressure. Co or Ni carboxylates reduced with aluminum alkyls can also be used.

Hydrogenation is carried out to remove the olefinic unsaturation present in the precursor copolymer. Hydrogenation may be complete or substantially complete. By complete hydrogenation is meant that all of the olefinic bonds are saturated. By substantially complete hydrogenation is meant that substantially all of the olefinic unsaturation is saturated. By substantially all olefinic unsaturation is meant at least about 80%, preferably at least about 90% of the olefinic unsaturation and most preferably greater than 98%.

Another embodiment of the present invention is a tapered block or segmented copolymer of hydrogenated butadiene and at least one other conjugated diene such as described hereinbefore, preferably isoprene. A tapered block or segmented copolymer according to this invention is a copolymer obtained by anionically copolymerizing in hydrocarbon solution in, for example, a batch reactor a mixture containing butadiene monomer and at least one other conjugated diene monomer to form a precursor copolymer having at least 75 weight percent 1,4-configuration of the butadiene and at least one other conjugated diene and then hydrogenating said precursor copolymer.

During the formation of the unhydrogenated precursor copolymer of butadiene and at least one other conjugated diene such as isoprene, at the beginning of the reaction butadiene, due to its relatively high reactivity, will be preferentially polymerized. The concentration of monomers in solution changes during the course of the reaction in favor of the other conjugated diene as the butadiene is depleted. The result is a precursor copolymer in which the copolymer chain is higher in butadiene concentration in the chain segments grown near the beginning of the reaction and higher in the other conjugated diene concentration in the chain segments formed near the end of the reaction. These copolymer chains are therefore tapered in composition. Upon hydrogenation the butadiene rich portion of the polymer becomes rich in substituted methylene units. Therefore, in each of these hydrogenated generally linear copolymer molecules two longitudinal segments can be discerned which gradually pass into each other and have no sharp boundaries. One of the outer segments consists nearly completely of methylene units derived from the hydrogenation of the butadiene in the 1,4-configuration and contains only small amounts of substituted methylene units derived from the hydrogenation of the other conjugated diene such as isoprene. The second segment is relatively rich in substituted methylene units derived, for example, from the hydrogenation of the isoprene in the 1,4-configuration. The first segment, which is rich in methylene units, comprises the crystallizable segment since it contains more than 20 mole percent 1,4-polybutadiene. The second outer segment comprises the low crystallinity segment since it contains less than about 20 mole percent 1,4-polybutadiene units. In those tapered block copolymers the crystallizable segment comprises an average of at least about 20 mole percent of the copolymer's chain.

The anionic polymerization and subsequent hydrogenation conditions used in the preparation of the tapered segmented or block copolymer are substantially the same as those described hereinbefore. The weight-average molecular weights of these tapered segmented or block hydrogenated copolymers are generally the same as those described above.

The weight percent of the butadiene present in the reaction mixture is that which is effective to form a tapered segmented or block copolymer having at least one crystallizable segment and at least one low crystallinity segment. Generally this amount of butadiene is from about 20 to about 90 weight percent. Additionally, the amount of the 1,4-configuration butadiene present in the precursor copolymer must be an amount which is effective to form a crystallizable segment upon hydrogenation of the precursor copolymer. Generally, this amount is at least about 80 weight percent.

The polymers can be recovered by procedures well known in the art. For example, polar materials, such as water or $C_1$ to $C_5$ alkanols can be added to inactivate the catalyst. Preferably, the reaction is terminated by dropping the reaction system into 2 to 10 volumes of methanol containing about 0.1 weight percent antioxidant. After termination of the reaction, the hydrocarbon solution is washed with water or dilute mineral acid. Alternatively, the active polymer solution can be treated with hydrated clays, such as natural Attapulgus clay, which functions to both inactivate the catalyst and to chemically absorb the lithium component. The polymer may be recovered by filtering the resultant polymer solution, drying if necessary, and stripping of remaining inert diluent at elevated temperatures (e.g., 70° to 120° C.) and reduced pressures (e.g., 0.1 to 100 mm. Hg). For the isolation of higher molecular weight polymers steam stripping or precipitation with anti-solvents is preferred.

By controlling the ratio of butadiene and isoprene in the anionic polymerization under conditions which give predominantly, 1,4-addition, it is possible to obtain an effective wide range of methylene to substituted methylene ratio in the hydrogenated product.

When the polymerization of the dienes has been completed, the copolymer thus obtained can be hydrogenated either immediately or after recovery to obtain the desired hydrogenated copolymers according to the invention.

The present invention includes compositions comprising an oleaginous material such as lubricating oil and at least one hydrogenated block copolymer as described. There can be a minor amount, e.g. 0.01 up to 50 weight percent, preferably 0.05 to 25 weight percent, based on the weight of the total composition, of the hydrogenated copolymer produced in accordance with this invention can be incorporated into a major amount of an oleaginous material, such as a lubricating oil or hydrocarbon fuel, depending upon whether one is forming finished products or additive concentrates. When used in lubricating oil compositions, e.g. automotive or diesel crankcase lubricating oil, copolymer concentrations are usually within the range of about 0.01 to 10 weight percent, of the total composition. The copolymers of the invention may be utilized in a concentrate form, e.g., from about 5 weight percent up to about 50 weight percent, preferably 7 to 25 weight percent oil, e.g., mineral lubricating oil, for ease of handling, and may be prepared in this form by carrying out the reaction of the invention in oil as previously discussed. The lubricating oils to which the products of this invention can be added include not only hydrocarbon oil derived from petroleum, but also include synthetic lubricating oils such as esters of dibasic acids; complex esters made by esterifications of monobasic acids, polyglycols, dibasic acids and alcohols; polyolefin oils, etc. The hydrogenated copolymers of the present invention are particularly useful as fuel and lubricating oil additives, particularly as viscosity Index improver lubricating oil additives.

The hydrogenated copolymers of the instant invention are oil-soluble, dissolvable in oil with the aid of a suitable solvent, or are stably dispersible therein. The terms oil-soluble, dissolvable in oil, or stably dispersible in oil as that terminology is used herein does not necessarily indicate that the materials are soluble, dissolvable, miscible, or capable of being suspended in oil in all proportions. It does mean, however, that the additives for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

The copolymers are particularly useful in lubricating oil compositions, which employ a base oil in which these copolymers are dissolved or dispersed. Base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

The above oil compositions may optionally contain other conventional additives, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of about 66° to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phosphosulfurized or sulfurized hydrocarbons, etc.

Other oxidation inhibitors or antioxidants useful in this invention comprise oil-soluble copper compounds. The copper may be blended into the oil as any suitable oil-soluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)_nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. particularly preferred as R and R, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclcpentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of $\overline{Mn}$ of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a Mn from about 900 to 1,400, and up to 2,500, with a Mn of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di- (lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight polyalkenyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulphonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. %. (Broad) | Wt. % (Preferred) |
| --- | --- | --- |
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |

-continued

| Additive | Wt. %. (Broad) | Wt. % (Preferred) |
| --- | --- | --- |
| Friction Modifiers | 0.01–5 | .01–1.5 |
| Detergents/Rust Inhibitors | 0.01–10 | .01–3 |
| Mineral Oil Base | Balance | Balance |

When other additives are employed, it may be desirable, although not necessary, to prepare additive concentrates comprising concentrated solutions or dispersions of the viscosity index modifying copolymers (in concentrate amounts hereinabove described), together with one or more of said other additives (said concentrate when constituting an additive mixture being referred to here in as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the viscosity index improving copolymer additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The additives of the present invention may be suitably incorporated into synthetic base oils such as alkyl esters of dicarboxylic acids, polyglycols and alcohols; polyalphaolefins, polybutenes, alkyl benzenes, organic esters of phosphoric acids, polysilicone oils, etc.

The final formulations may employ typically about 10 weight percent of the additive-package with the remainder being base oil.

Accordingly, while any effective amount, i.e., viscosity index improving effective amount, of the additives of the present invention can be incorporated into the fully formulated lubricating oil composition, it is contemplated that such effective amount be sufficient to provide said lube oil composition with an amount of the additive of typically from about 0.01 to about 10, preferably 0.1 to 6.0, and more preferably from 0.25 to 3.0 weight percent, based on the weight of said composition.

EXAMPLES

The following examples, which include preferred embodiments further illustrate the present invention. Unless otherwise stated, all of said weight percents expressed herein are based on active ingredient (a.i.) content of the additive, and/or upon the total weight of any additive-package, or formulation which will be the sum of the a.i. weight of each additive plus the weight of total oil or diluent.

Thickening efficiency (T.E.) is defined as the ratio of the weight percent of a polyisobutylene (sold as an oil solution by Exxon Chemical Company as Paratone® N), having a Staudinger molecular weight of 20,000, required to thicken a solvent-extracted neutral mineral lubricating oil, having a viscosity of 150 SUS at 37.8° C., a viscosity index of 105 and an ASTM pour point of O.F. (Solvent 150 Neutral) to a viscosity of 12.4 centistokes at 98.9° C. to the weight percent of a test copolymer required to thicken the same oil to the same viscosity at the same temperature. For linear polymers of a given methylene content, the thickening efficiency is approximately proportional to the 0.75 power of the weight-average molecular weight.

Low temperature properties of the lubricating oils of the present invention are evaluated by a number of significant tests:

MRV (Mini Rotary Viscometer), using a technique described in ASTM-D3829, measures viscosity in centipoise and yield stress in Pascals. MRV was determined at −25° C.

CCS (Cold Cranking Simulator), using a technique in ASTM-D2602, a high shear viscosity measurement in centipoises. This test is related to a lubricating oil's resistance to cold engine starting.

TP1 cycle MRV-Determined by ASTM D4684. This is essentially the same as the ASTM MRV noted above, except a slow cooling cycle is used. The cycle is defined in SAE Paper No. 850443, K. O. Henderson et al.

The copolymer of the present invention, when used to formulate lubricating oils, has been found to lower the viscosity measured using the Cold Cranking Simulator Test. At the same time, low TP-1 cycle MRV is maintained or lowered. The thickening efficiency is improved and the lube oil has high viscosity at high temperatures and low viscosity at low temperatures.

Example 1

A poly(isoprene-b-butadiene-b-isoprene) tri- block copolymer was prepared using a a high vacuum technique. The experimental procedure is described in detail in the reference: M. Morton, L. J. Fetters, *Rubber Chem. Tech.*, 48, 359 (1975). 467 g. of cyclohexane were charged to a 1 liter reaction flask. To this was added 15.7 g. isoprene, followed by 0.0199 g sec-butyllithium initiator. The mixture was allowed to react at 24° C. for 24 hours. 24.6 g. 1,3-butadiene was then added to the reaction mixture, and allowed to react for 24 hours. 15.7 g. isoprene was then added to the reaction mixture and again allowed to react for 24 hours. The reaction was then terminated by adding degassed methanol. The resulting copolymer had total weight average molecular weight of 180,000, with each polybutadiene block having weight average molecular weight of 80,000. The ratio of weight average to number average molecular weight was less than 1.2. The microstructure was measured to be blocks of about 93 weight percent 1,4-addition of isoprene and about 7 weight percent 3,4-addition of isoprene, and blocks of about 93 weight percent 1,4-addition butadiene and about 7 weight percent 1,2-addition of butadiene.

Example 2

The polymer prepared in Example 1 was hydrogenated as follows. 50 g. of the copolymer prepared in Example 1 was charged to 2 liter high pressure reactor. About 0.75 gal. cyclohexane was added and the polymer allowed to dissolve overnight at room temperature. The volume of cyclohexane was then increased to abut 5 liters and a nitrogen sparge was begun. 15 g. Pd on $CaCO_3$ hydrogenation catalyst was then added to the cyclohexane solution. The reactor was sealed and hydrogen was added to a pressure of 3800 kPa. The temperature was increased to 80° C. The hydrogenation was allowed to proceed for about 18 hours. The reactor was then slowly vented to atmospheric pressure and the cyclohexane solution filtered through a heated filter. The polymer was not completely hydrogenated, as evidenced by a 1640 cm$^{-1}$ peak in the infra-red, so the product was rehydrogenated, tested according to ASTM D2238-68. An additional 15 g. of fresh catalyst was added to the cyclohexane solution and the solution returned to the reactor, where it was hydrogenated as described above for an additional 21 hours. The solution was again filtered through a heated filter, this time the 1640 cm$^{-1}$ peak was absent, so the cyclohexane was evaporated on a steam bath. Proton NMR analysis showed 0.94 mole percent polybutadiene unsaturation and 1.89 mole percent polyisoprene unsaturation.

Example 3

The polymer described in Example 2 was dissolved in a mid-continent type S150N mineral oil, at an amount sufficient to raise the kinematic viscosity at 100° C. to 13.5 cSt, along with 0.4 weight percent of a commercial fumarate-vinyl acetate lube oil flow improver. Low temperature viscometric properties are given in Table 2 below.

Example 4

A poly(isoprene-b-butadiene) diblock copolymer was prepared using a high vacuum technique as described in Example 1. To 505 g. cyclohexane was added 28.6 g. isoprene and 0.036 g. sec-butyllithium. This was allowed to react at 25° C. for 24 hours. 22.4 g. butadiene was then added to the mixture and allowed to react for an additional 24 hours. The reaction was terminated by adding degassed methanol. The resulting copolymer had a weight average molecular weight of 91,000, and microstructure similar to that in Example 1. The Mw/Mn was 1.1.

Example 5

The polymer prepared in Example 4 was hydrogenated as described in Example 2. This time, 5 g. of the diblock copolymer was dissolved in 700 ml cyclohexane overnight at room temperature. 6.0 g. Pd on CaCO$_3$ hydrogenation catalyst was added to the reactor and the reactor sealed. Hydrogen pressure was increased to 3000 kPa and the reactor heated to 70° C. The hydrogenation was carried out for 21 hours, at which time the pressure was released, and the cyclohexane hot filtered to remove the catalyst. The 1640 cm$^{-1}$ IR band was absent.

Example 6

The polymer described in Example 5 was dissolved in a mid-continent type S150N mineral oil, at an amount sufficient to raise the kinematic viscosity at 100° C. to 3.5 cSt, along with 0.4 weight percent of a commercial fumarate-vinyl acetate flow improver. Low temperature viscometric properties are given in Table 2 below.

Comparative 1

This example illustrates the segmented copolymers of U.S. Pat. No. 4,804,794. Conditions of polymerization and results are summarized in Table 1.

TABLE 1

| | |
|---|---|
| Reactor Inlet Temp. (°C.) | 19.5 |
| Reactor Outlet Temp. (°C.) | 46 |
| Sidestream Feed Temp. (°C.) | 5 |

TABLE 1-continued

| | |
|---|---|
| Catalyst Premix Temp. (°C.) | 14.5 |
| Catalyst Premix Temp. (sec.) | 8 |
| Reactor Residence Time (sec. at | |
| Sidestream 1 | .68 |
| Sidestream 2 | .84 |
| Reactor Res. Time at Quench (sec.) | 2.2 |
| Inlet Feed Rates (kg/hr | |
| Hexane | 1828 |
| Ethylene | 18 |
| Propylene | 270 |
| VCl$_4$ | .288 |
| Al$_2$(C$_2$H$_5$)$_3$Cl$_3$ | 1.24 |
| Sweep Hexane (kg/hr)$^{(1)}$ | 102 |
| Sidestream Feed Rates (Kg/hr)$^{(2)}$ | |
| Hexane | 1092 |
| Ethylene | 49.2 |
| Propylene | 49.2 |
| Total Hexane (Kg/hr) | 3020 |
| Sidestream Feed Splits (wt. %) | |
| Sidestream 1 | 60 |
| Sidestream 2 | 40 |
| M$_w$ (× 10$^3$) | 180 |
| M$_w$/M$_n$ | 1.5 |
| Composition (ethylene wt. %) | 53 |
| Quench (kg/hr) | |
| Ethanol | 4.5 |
| H$_2$O | — |
| Crystallinity (%) | 2 |

Notes:
$^{(1)}$Sweep hexane introduced with catalysts.
$^{(2)}$Total of equal sidestream flows, except where indicated.

Comparative 2

The copolymer described in Comparative 1 was dissolved in a Mid-Continent type S150N mineral oil, at an amount sufficient to raise the kinematic viscosity at 100° C. to 13.5 cSt, along with 0.4 weight percent of a commercial fumarate-vinyl acetate flow improver. Low temperature viscometric properties in centipoise (cP) are given in Table 2.

TABLE 2

| Polymer | CCS, TE | −20° C. | MRV, −25° C. | TP-1, −25° C. |
|---|---|---|---|---|
| Example 3 | 3.8 | 2450 cP | 11,400 cP | 10,900 cP |
| Example 5 | 2.1 | 2750 | 16,000 | 23,500 |
| Comp. 2 | 3.4 | 2800 | 12,000 | 11,500 |

Table 2 shows improved CCS viscosity of the segmented block copolymers produced by the current invention, Examples 3 and 5, compared to the less well defined segmented structure described in Comparative Example 1.

Example 7

A four arm poly(isoprene-b-butadiene) star polymer was prepared using a high vacuum technique. To 505 g. cyclohexane was added 28.6 g. isoprene and 0.036 g. sec-butyllithium. This was allowed to react at 25° C. for 24 hours. 22.4 g butadiene was then added to the mixture and allowed to react for an additional 24 hours. The star polymer was formed by adding 0.0252 g. SiCl$_4$ linking agent, allowing the mixture to react for 24 hours. The reaction was terminated by adding degassed methanol. The resulting star copolymer had a weight average molecular weight of 260,000, with blocks of about 93% 1,4 isoprene, and about 7% 3,4-isoprene additions, and blocks of about 93% 1,4-butadiene additions and 7% 1,2-butadiene additions.

Example 8

The polymer described in Example 7 was hydrogenated. 5.0 of the polymer described in Example 1 was dissolved in 900 ml. cyclohexane at room temperature overnight. 6.0 g. Pd on $CaCO_3$ hydrogenation catalyst was added to the cyclohexane solution and the reactor sealed. Hydrogen pressure was increased to 3000 kPa and the temperature increased to 70° C. The hydrogenation was performed for 20 hours, at which time the pressure was reduced to atmospheric and the cyclohexane solution hot filtered to remove the catalyst. The polymer was precipitated in methanol. The olefinic 1640 $cm^{-1}$ IR band was completely eliminated.

Example 9

The polymer of Example 8 was dissolved in mid-continent type mineral oil as recited in Example 6. Low temperature viscometeric properties are given in Table 3.

Example 10

A star polymer was prepared as follows. To 575 g. cyclohexane was added 29.3 g. butadiene and 115 g. sec-butyllithium. This was allowed to react at 25° C. for 24 hours. 56.9 g. isoprene was then added to the mixture and allowed to react for an additional 24 hours. The star polymer was formed by adding 0,081 g. $SiCl_4$ linking agent, allowing the mixture to react for 24 hours. The reaction was terminated by adding degassed methanol. The resulting star copolymer had a weight average molecular weight of 180,000, with about 93% 1,4 isoprene and butadiene additions. 7% 1,2-butadiene additions, and about 7% 3,4-isoprene additions.

Example 11

The polymer described in Example 10 was hydrogenated. 28 g. of the polymer described in Example 10 was added to 3000 ml. cyclohexane and dissolved at room temperature overnight. 1.42 g Ni-2-ethylhexanoate and 6.74 g triethyl aluminum (25% in hexane) were then added to the cyclohexane solution. The reactor was sealed and heated to 50° C. and a pressure of 4000 kPa hydrogen applied. The hydrogenation was carried out for abut 15 hours, at which point the pressure was released and the product hot filtered. The polymer solution was deashed using acidic water stripping and the cyclohexane flashed off on a steam bath. IR analysis showed essentially complete polybutadiene hydrogenation, and 4 mole percent polyisoprene units not hydrogenated.

Example 12

The polymer from Example 11 was dissolved according to the procedure used in Example 6. Low temperature viscometric properties are shown in Table 3.

TABLE 3

|  | TE | CCS, −20° C. | MRV, −25° C. | TP-1, −25° C. |
| --- | --- | --- | --- | --- |
| Example 9 | 2.74 | 2700 cP | 13,900 cP | 18,700 cP |
| Example 12 | 1.99 | 2820 cP | 14,700 cP | 19,000 cP |

Table 3 shows that polymers having the crystallinity on the end of the arms, such as Example 11, have higher CCS viscosity than those with the crystallizable portion near the core, as in Example 9.

Example 13

The room temperature concentrated solution fluidity of the polymers prepared in Example 11 was determined by dissolving enough polymer in a midcontinent type S100N mineral oil to raise the 100° C. kinematic viscosity to 1600 cSt. The oil solution was allowed to cool to room temperature and the appearance was checked after 2 days. The solution exhibited an undesirable gel-like structure, inhibiting flow. On the other hand, the polymer described in Example 9 does not exhibit the gel structure in a concentrate at room temperature.

While exemplary embodiments of the invention have been described, the true scope of the invention is to be determined from the following claims.

What is claimed is:

1. A block copolymer comprising monomeric units derived from butadiene and at least one conjugated diene comonomer represented by the formula

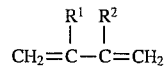

wherein $R^1$ is a $C_1$ to about $C_8$ alkyl radical and $R^2$ is hydrogen or $C_1$ to about $C_8$ alkyl radical, the copolymer being hydrogenated and comprising (i) at least 10 percent by weight of at least one crystallizable segment comprised of methylene units in sequences sufficiently long to impart crystallinity to said segment and having an average methylene content corresponding to a 1,4-polybutadiene content of at least about 20 mole percent, and (ii) more than one low crystallinity segment comprised of methylene units and substituted methylene units and having an average 1,4-polybutadiene content less than about 20 mole percent.

2. The hydrogenated copolymer as recited in claim 1 where $R^2$ is hydrogen.

3. The hydrogenated copolymer as recited in claim 2 wherein $R^1$ is methyl.

4. The hydrogenated copolymer as recited in claim 1 containing chain segment sequences represented by the structure:

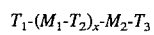

wherein x is a number of from 0 to 3, $M_1$ and $M_2$ are the same or different and each comprises said crystallizable segment, and $T_1$, $T_2$ and $T_3$ are the same or different and each comprises said low crystallinity segment.

5. The hydrogenated copolymer as recited in claim 4 wherein x is zero.

6. The hydrogenated copolymer as recited in claim 5 wherein said $T_1$ and $T_3$ segments are the same weight average molecular weight.

7. The hydrogenated copolymer as recited in claim 1 wherein the butadiene is present in the 1,4-configuration in amounts effective to provide said at least one crystallizable segment and conjugated diene and 1,2-butadiene in amounts effective to provide said more than one low crystallinity segment.

8. The hydrogenated copolymer as recited in claim 7 wherein said amount of butadiene in the 1,4 configuration is at least about 30 mole percent.

9. The hydrogenated copolymer as recited in claim 1 wherein said copolymer has a molecular weight distribution characterized by a ratio of $\overline{Mw}/\overline{Mn}$ of less than 2.

10. The hydrogenated copolymer as recited in claim 1 wherein the crystallizable segment comprises sequences of at least 11 adjacent methylene units in series.

11. The hydrogenated copolymer as recited in claim 10 wherein the low crystallinity segment comprises sequences of less than 11 adjacent methylene units in series.

12. The hydrogenated copolymer as recited in claim 11 wherein the low crystallinity segment comprises sequences of less than 7 adjacent methylene units in series.

13. The hydrogenated copolymer as recited in claim 1 wherein the crystallizable segment has a number average molecular weight of at least 500.

14. The hydrogenated copolymer as recited in claim 1 wherein the copolymer is a star block copolymer.

15. The hydrogenated copolymer as recited in claim 14 wherein the star block copolymer has from 4 to 25 arms.

16. The hydrogenated copolymer as recited in claim 13 wherein the star block copolymer has from 5 to 15 arms.

17. The hydrogenated copolymer as recited in claim 14 wherein the star block copolymer has a weight average molecular weight of from 100,000 to 500,000.

* * * * *

UNITED STATES PATENT AND TRADEMARK OFFICE
CERTIFICATE OF CORRECTION

PATENT NO. : 5,543,469
DATED : Aug. 6, 1996
INVENTOR(S) : M.J. Struglinski et al.

It is certified that error appears in the above-indentified patent and that said Letters Patent is hereby corrected as shown below:

In Claim 16, column 32, line 8, after the word "claim", please amend dependent claim number to read "15", and delete number "13".

Claim 16 should now read as follows:

"16. The hydrogenated copolymer as recited in claim 15 wherein the star block copolymer has from 5 to 15 arms."

Signed and Sealed this

Twenty-fifth Day of March, 1997

Attest:

BRUCE LEHMAN

Attesting Officer

Commissioner of Patents and Trademarks